United States Patent [19]

Van Antwerp

[11] 4,343,484
[45] Aug. 10, 1982

[54] POWER HITCH

[76] Inventor: Ferne R. Van Antwerp, R.R. 1, Unionville, Iowa 52594

[21] Appl. No.: 140,668

[22] Filed: Apr. 15, 1980

[51] Int. Cl.³ .............................................. B62D 1/04
[52] U.S. Cl. .............................. 280/479 A; 280/415 R
[58] Field of Search ........... 280/479 A, 479 R, 478 R, 280/478 B, 477, 415

[56] References Cited

U.S. PATENT DOCUMENTS

| 2,671,673 | 3/1954 | Benson | 280/477 |
| 2,904,349 | 9/1959 | Frieberg | 280/479 A |
| 2,983,523 | 5/1961 | Kienzle | 280/479 A |
| 3,420,549 | 1/1969 | Robinson | 280/477 |
| 3,695,630 | 10/1973 | Zucca | 280/474 |
| 3,716,253 | 2/1973 | Gniffke | 280/479 A |
| 3,863,955 | 2/1975 | Muncke et al. | 280/479 A |

FOREIGN PATENT DOCUMENTS 937035 9/1963 United Kingdom ........... 280/479 A

Primary Examiner—Joseph F. Peters, Jr.
Assistant Examiner—Donn McGiehan
Attorney, Agent, or Firm—Henderson & Sturm

[57] ABSTRACT

A power hitch for a draft vehicle including an upwardly extending hitch pin and a guide block disposed adjacent to the hitch pin for guiding the aperture of a trailing implement draft tongue immediately over the hitch pin. The power hitch is adapted for use with a draft vehicle having a conventional hydraulic power lift system.

2 Claims, 13 Drawing Figures

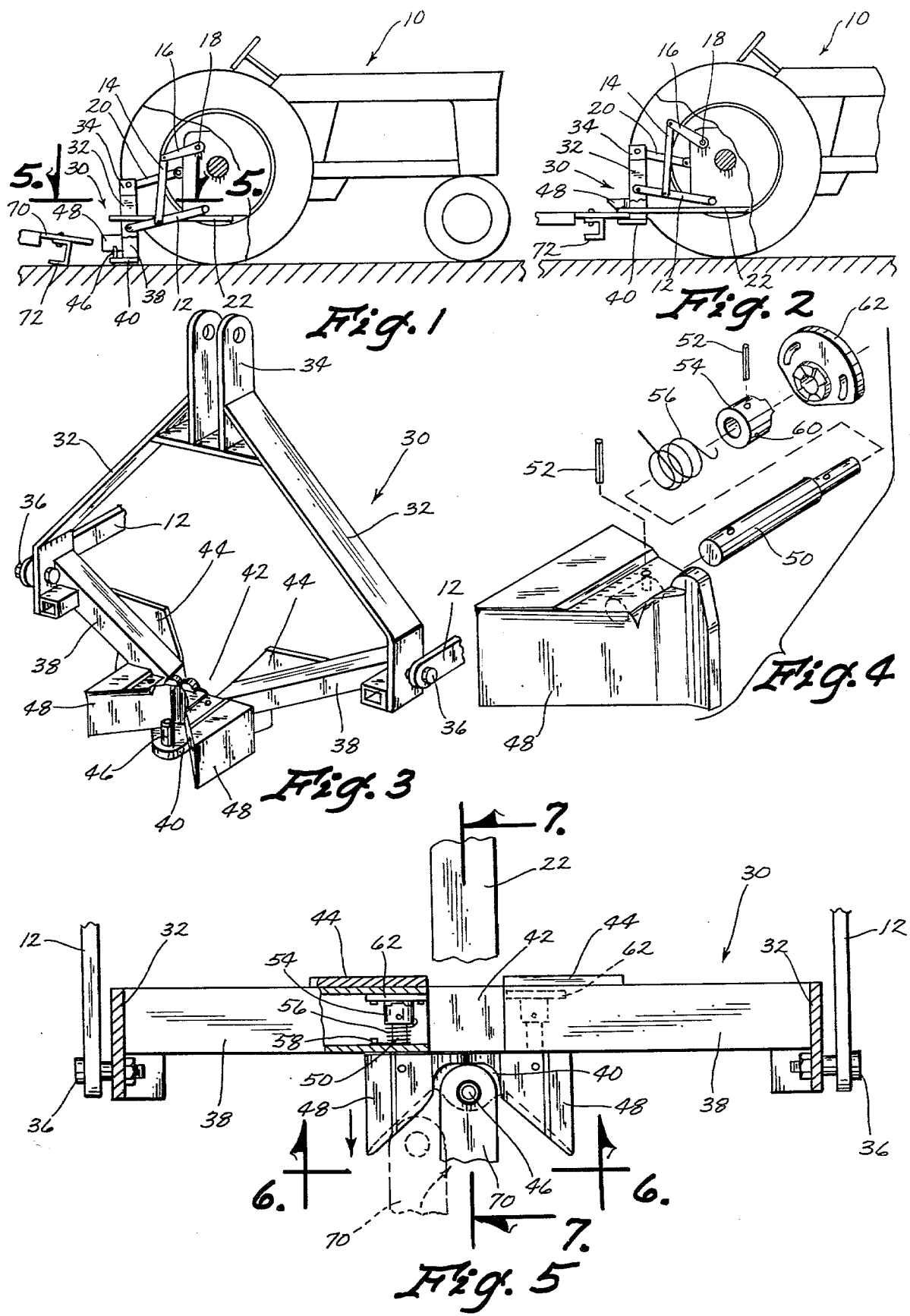

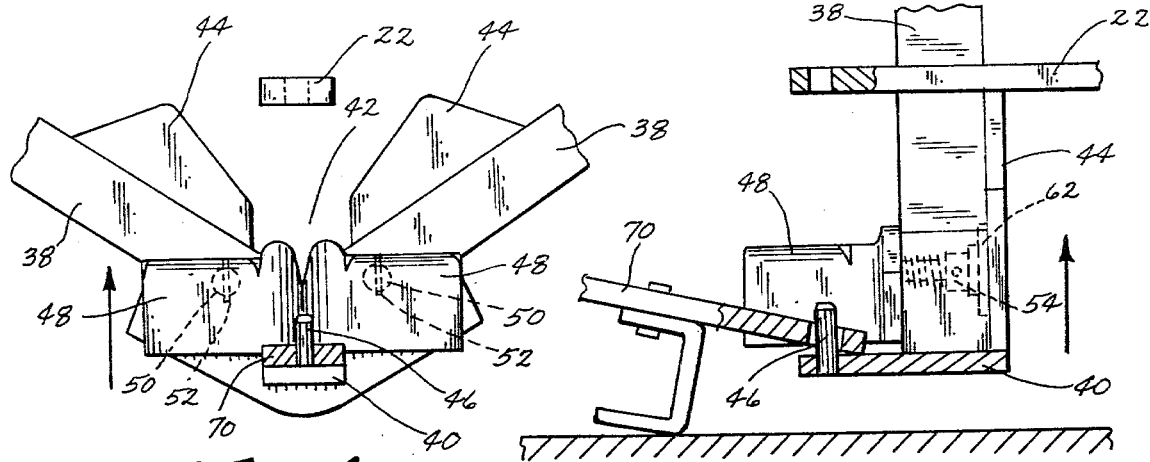
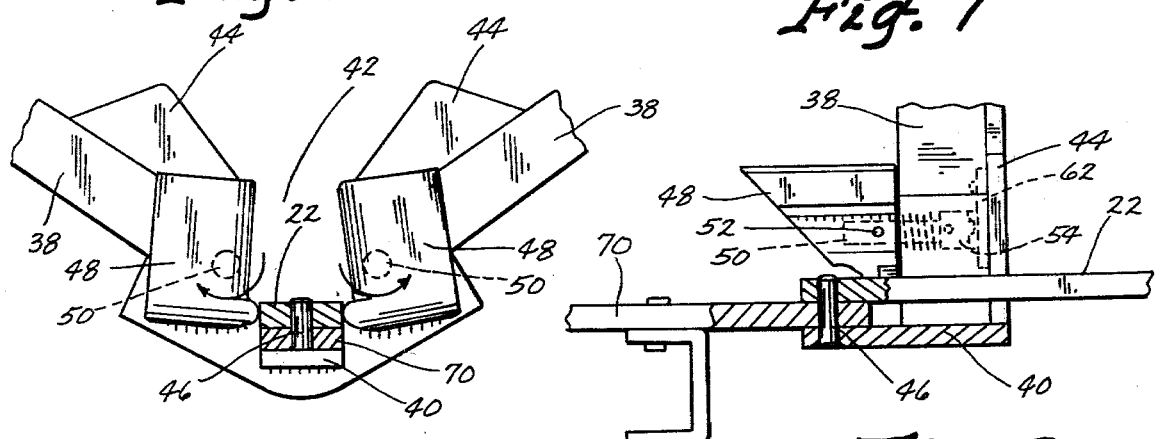

POWER HITCH

BACKGROUND OF THE INVENTION

The present invention relates generally to hitching devices and more particularly to a hitch device that can be used to accomplish all tasks necessary to connect trailing implements to draft vehicles directly from the operator's station.

Hitching devices presently available have several disadvantages, including highly complex structures resulting in the need for levers, rods, cables or the like extending to the operator's station. Further, these complex structures require a great deal of operator time to install and disassemble which limits the flexibility of the draft vehicle. Those concerned with these and other problems recognize the need for an improved hitch device.

SUMMARY OF THE INVENTION

The present invention discloses a power hitch for connecting implements to a draft vehicle without the need of the operator leaving his station. The power hitch includes a frame which carries an upwardly extending hitch pin disposed in the vicinity of a guide block. One embodiment discloses a pair of spring-biased guide blocks which guide the implement draft tongue to a position directly over the hitch pin as the draft vehicle is backed up towards the implement.

The bracket is lowered to ground or near ground level by the hydraulic lift arms of the draft vehicle. The vehicle is then backed-up and the aperture in the draft tongue is aligned with the connecting hitch pin. As the lift arms are raised, the connecting pin extends through the aperture and the implement hitch is moved upwardly toward the rigid drawbar. When the drawbar contacts the upper surface of the guide blocks, the guide blocks rotate 90° thus providing a space wide enough to accommodate the drawbar and the opening in the drawbar is registered with the connecting pin. The upward force exerted by the hydraulic lift arms holds the connecting pin in place extending through the opening in the drawbar.

An object of the present invention is the provision of an improved hitching device.

Another object is to provide a hitching device that facilitates the hitching operation without requiring that the operator leave his station.

A further object of the invention is the provision of a hitch device that is controlled by the hydraulic power lift system of a draft vehicle.

Still another object is to provide a hitch device that is easy to operate and maintain.

A still further object of the present invention is the provision of a power hitch that is easily mounted on and dismounted from a draft vehicle.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side-elevational view with portions cut-away to show the power hitch in the lowered position;

FIG. 2 is a side-elevational view similar to FIG. 1, but showing the power hitch in the raised position;

FIG. 3 is a perspective view showing one embodiment of the power hitch adapted for use with a three-point hitch and having biased rotatable guide blocks;

FIG. 4 is an enlarged exploded perspective view showing the guide block pivot and clutch assembly;

FIG. 5 is a top plan view taken along line 5—5 of FIG. 1, the cut-away portion showing the guide block pivot and clutch assembly;

FIG. 6 is a rear-elevational view taken along line 6—6 of FIG. 5, showing the power hitch in the lowered position;

FIG. 7 is a side-elevational view taken along line 7—7 of FIG. 5, showing the power hitch in the lowered position;

FIG. 8 is a rear-elevational view similar to FIG. 6, but showing the power hitch in the raised position;

FIG. 9 is a side-elevational view similar to FIG. 7, but showing the power hitch in the raised position;

DESCRIPTION OF THE PREFERRED EMBODIMENTS

Figure 10:
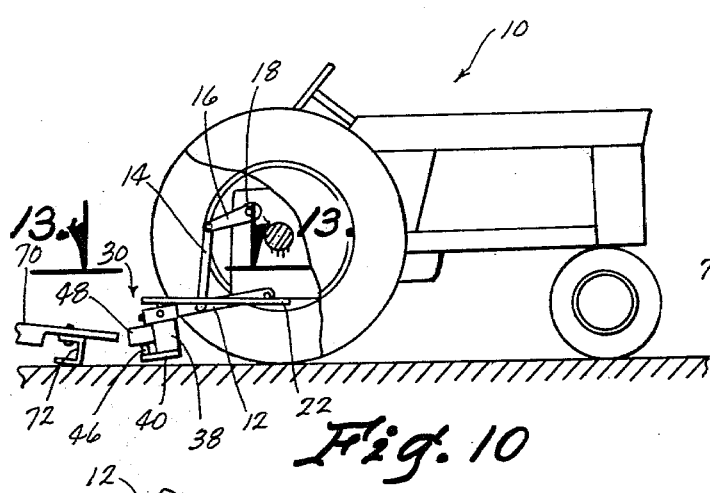
FIG. 10 is a side-elevational view similar to FIG. 1, but showing an embodiment of the power hitch adapted for use with a two-point hitch, the power hitch being in the lowered position.
Figure 11:
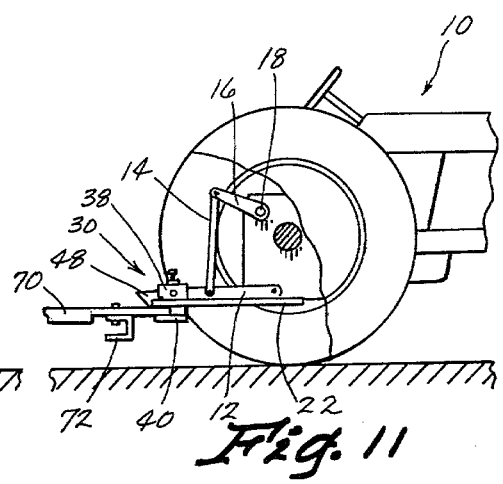
FIG. 11 is a side-elevational view similar to FIG. 10, but showing the power hitch in the raised position.

Referring now to the drawings wherein like reference numerals designate identical or corresponding parts throughout the several views, FIG. 1 shows the power hitch device of the present invention mounted on a tractor generally designated by the reference numeral 10. The tractor 10 has a power lift system including a pair of generally vertically and laterally swingable draft links 12 connected at their forward ends for universal movement relative to the tractor 10. The draft links 12 are connected by lift links 14 with a pair of lift arms 16 operably connected to a rockshaft 18. The rockshaft 18 forms a part of the hydraulic power lift system carried by and forming a part of the tractor 10. The power lift system illustrated in FIGS. 1 and 2 also includes a stabilizer link 20 pivotally attached to the tractor 10, which together with draft links 12 forms a conventional three-point hitch. The power lift system shown in FIGS. 12 and 13 does not include a third link. The tractor 10 also includes a drawbar 22 connected at its forward end with the tractor 10 to receive draft power therefrom.

As shown in FIG. 3, the power hitch indicated in its entirety by the reference numeral 30 includes a vertically disposed frame 32 having an upper portion which forms a clevis 34 adapted to connect with the stabilizer link 20 (not shown). The lateral sides of the lower portion of frame 32 include laterally outwardly extending studs 36 which receive the rearward ends of the draft links 12. Thus, the frame 32 is mounted on the three-point hitch power lift system for movement between a first lowered portion (FIG. 1) and a second raised position (FIG. 2).

At its lower end frame 32 carries a pair of downwardly and inwardly inclined transverse tubular cross members 38 which extend between the lateral sides of frame 32. The cross members 38 are connected at the lowermost portions by a plate 40 and a slot 42 is provided between the lower ends of cross members 38. The slot 42 is of a width sufficient to accommodate the width of the drawbar 22. Inclined plates 44 are attached to the cross members 38 and define the upper portion of slot 42.

A hitch pin 46 extends upwardly from plate 40 and a pair of guide blocks 48 are disposed in spaced relationship lateral to and forward of the hitch pin 46. It is understood that the hitch pin 46 could be replaced by numerous structures including one adapted for use with an apertured swivel ball or a standard ball of a mating ball and socket structure. As best shown in FIGS. 4 and 5, the guide blocks 48 are mounted on cross members 38 for pivotal movement about rod 50. Rod 50 is secured by pins 52 to guide block 48 and clutch sleeve 54. A spring 56 is disposed intermediate the clutch sleeve 54 and the rearward inside surface of tubular cross member 38. One end of spring 56 is secured to cross member 38 by tabs 58 and the opposite end is secured to clutch sleeve 54 by engagement with aperture 60 thus biasing the guide block 48 in the position shown in FIG. 5. A clutch plate 62 is mounted to the forward inside surface of tubular cross member 38 and the mating relationship of sleeve 54 and clutch plate 62 allows rotation of the guide block 48 in only one direction. As shown in FIGS. 4 and 5 it is necessary for the guide block 48 to first be displaced rearwardly during the initial few degrees of rotation.

Figure 12:
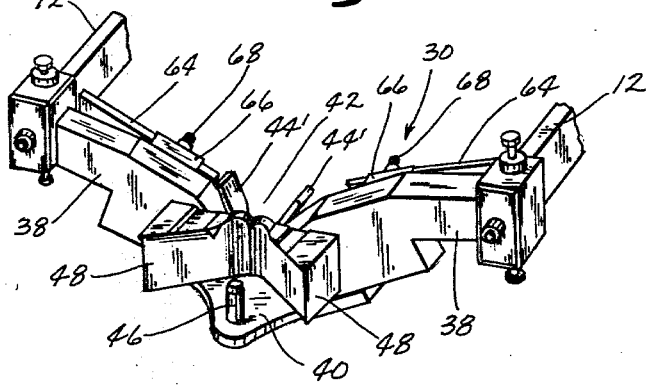
FIG. 12 is a perspective view showing an embodiment of the invention adapted for use with a two-point hitch and having biased rotatable guide blocks.
Figure 13:
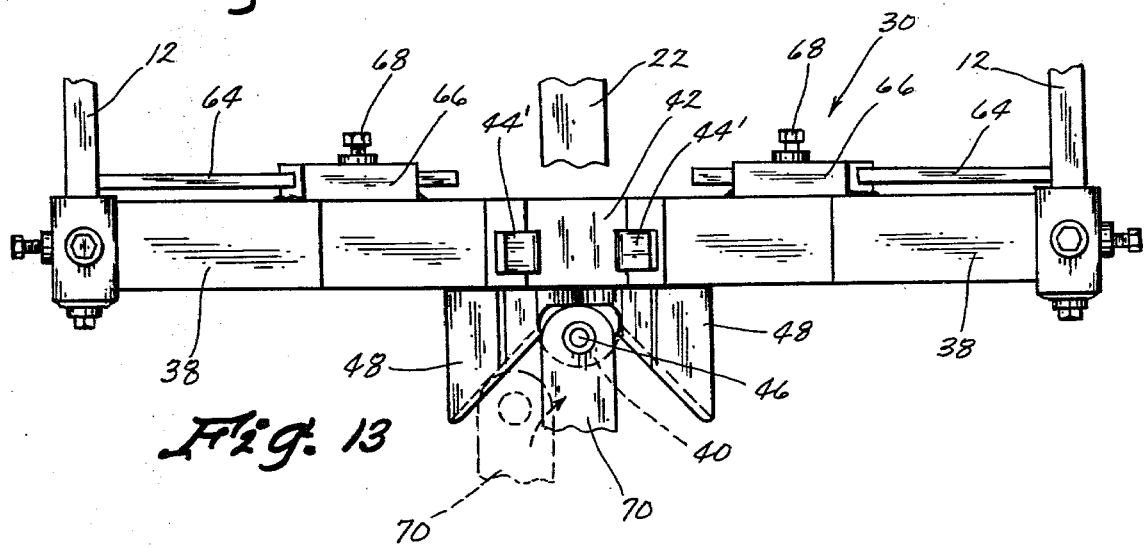
FIG. 13 is a top plan view taken along line 15—15 of FIG. 10.

FIGS. 10-13 illustrate an embodiment of the power hitch 30 that is adapted for use with a two-point hitch. FIGS. 12 and 13 show adjustably extendable stabilizer straps 64 held in contacting position with draft links 12 by cooperation of sleeve 66 and set screw 68.

As can be seen from the previous description, the power hitch 30 can be easily connected to or disconnected from a conventional two-point or three-point hitch of a tractor's power lift system. In operation, the power hitch 30 is lowered to the first lowered position as shown in FIGS. 1, 5, 6, and 7. As the tractor 10 is backed up the guide blocks 48 contact the draft tongue 70 and guide it to a position where the aperture in the draft tongue 70 is disposed directly above the hitch pin 46. (FIG. 5). The power lift system is then actuated to bring the power hitch 30 towards the second raised position best illustrated by FIGS. 2, 8 and 9. As the power hitch is raised, the guide blocks 48 approach and contact the stationary drawbar 22. The force of the drawbar 22 against the guide blocks 48 causes the guide blocks 48 to rotate 90° as best shown in FIG. 8. The drawbar 22 finally comes into contact with the draft tongue 70 with the aperture in the drawbar 20 registering with the hitch pin 46. To disconnect the trailing implement, the power hitch 30 is simply lowered to the point where the hitch pin 46 disengages from the draft tongue 70. To facilitate connecting and disconnecting of the draft tongue 70 and power hitch 30 and elevating bracket 72 is attached near the end of draft tongue 70.

Thus it can be seen that at least all of the stated objectives have been achieved.

Obviously many modifications and variations of the present invention are possible in light of the above teachings. It is therefore to be understood that, within the scope of the appended claims, the invention may be practiced otherwise than as specifically described.

I claim

1. A power hitch for connecting a trailing implement draft tongue to the drawbar of a draft vehicle, said power hitch comprising:

a frame attached to said draft vehicle;

an upwardly extending hitch pin mounted on said frame;

two guide blocks attached to said frame and disposed adjacent to and at the lateral sides of said hitch pin, whereby said guide blocks contact the free end of said implement draft tongue and guide it to a position above said hitch pin;

an intermediate slot disposed immediately forward of said hitch pin;

means for rotating said guide blocks in the direction of said hitch pin, said guide block rotation means including means for biasing said guide blocks in a first position;

means for preventing rotation of said guide blocks in one direction including a clutch plate attached to said frame and a mating clutch sleeve connected to said guide block and biased in contacting relationship with said clutch plate;

means for moving said frame between a first lowered position, wherein said hitch pin will initially engage the free end of said implement draft tongue; and a second raised position wherein said hitch pin couples the trailing implement to the draft vehicle.

2. The power hitch of claim 1, wherein said drawbar has an opening therethrough and said hitch pin enters the opening in said drawbar from the bottom when said frame is in said second raised position.

* * * * *